US006365988B1

(12) United States Patent
Imer et al.

(10) Patent No.: US 6,365,988 B1
(45) Date of Patent: Apr. 2, 2002

(54) POWER CONTROLLER FOR SETTING THE POWER OF THE ELECTRICAL LOADS OF AN ELECTRICAL APPLIANCE

(75) Inventors: Klaus Imer, Kronach; Rohit Vepari, Marktrodach; Jürgen Quiner, Wilhelmsthal; Wilfried Klopfer, Kronach, all of (DE)

(73) Assignee: Dreefs GmbH Schaltgerate und Systeme (DE)

( * ) Notice: Subject to any disclaimer, the term of this patent is extended or adjusted under 35 U.S.C. 154(b) by 0 days.

(21) Appl. No.: 09/453,257

(22) Filed: Dec. 2, 1999

(30) Foreign Application Priority Data

Dec. 4, 1998 (DE) ..................................... 298 21 663 U
Jul. 21, 1999 (DE) ........................................ 199 34 199

(51) Int. Cl.[7] ................................................ H02M 3/00
(52) U.S. Cl. ........................................................ 307/31
(58) Field of Search ............................. 307/31, 34, 52, 307/53, 85, 86

(56) References Cited

U.S. PATENT DOCUMENTS 4,563,624 A * 1/1986 Yu
4,697,136 A * 9/1987 Ishikawa

FOREIGN PATENT DOCUMENTS

| | | |
|---|---|---|
| DE | 3526892 | 2/1987 |
| DE | 3719308 | 12/1988 |
| DE | 3908242 | 9/1990 |
| DE | 4028954 | 3/1992 |
| DE | 4224666 | 1/1994 |
| DE | 29519021 | 3/1996 |
| EP | 0562287 | 9/1993 |

* cited by examiner

*Primary Examiner*—Edward H. Tso
(74) *Attorney, Agent, or Firm*—Ostrolenk, Faber, Gerb & Soffen, LLP

(57) ABSTRACT

In a power controller for setting the power of the electrical loads of an electrical appliance, in particular of an electrical cooker, the heating resistance of a load can be connected selectively to the phase voltage of, for example, 230 V or to the line voltage of, for example 400 V. The heating power can be pulsed electromechanically in each switching level, in which case the power pulses which are supplied to the load and are switched on for relatively different times govern the percentage of the heating power. The minimum available heating power of about 2.5 to 3.5% of the maximum heating power is achieved reliably and in the long term in that a lower voltage is applied in the lower power range than in the highest power range. In order to ensure that the bimetallic heating resistor is always connected to a low voltage when the hot plate resistance is connected to two operating voltages (400 V and 230 V), a half-wave rectifier arrangement is provided, which acts on the bimetallic heating resistor only at the higher operating voltage.

14 Claims, 6 Drawing Sheets

POWER CONTROLLER FOR SETTING THE POWER OF THE ELECTRICAL LOADS OF AN ELECTRICAL APPLIANCE

FIELD OF THE INVENTION

The invention relates to a power controller for setting the power of the electrical loads of an electrical appliance, which is connected at least by two phases to a three-phase mains power supply, in particular for the electromechanically pulsed hot plates of electric cookers.

BACKGROUND OF THE INVENTION

In electromechanical power controllers, a heated bimetallic strip acts on a snap-action switch, and the duty ratios in the individual power levels are set by a control cam.

In the case of those power controllers which use a heated bimetallic strip with a compensation bimetallic strip, the problem of switching hysteresis (which is linked to the bimetallic strip) arises, so that known power controllers can control the power only from about 7% to full load. However, setting to an even lower percentage value is desirable.

In order to overcome the switching hysteresis in an electromechanically pulsed power controller and to reduce the minimum available heating power, it is known from EP-A-0 562 287 for a region with a power level which is between the minimum power level and the maximum power level to be inserted in the switching region of the actuating element between the switched-off position and the minimum power level. As a result of the fact that the power is briefly increased to about 30 to 50% of the maximum power in the intermediate region, the pulsating contact of the snap-action switch remains ensured during the subsequent switching-back process, and the adjustment problem which occurs with such power controllers is solved by the bimetallic strip being briefly initially heated before the lowest power level is switched on.

In contrast to electromechanical power controllers, in the case of electronic power controllers which operate with a microprocessor which predetermines the duty ratio in the individual power levels, the power level can be set safely and infinitely variably between 0 and 100%. The disadvantage of these electronic power controllers is that the costs are several times the costs of an electromechanical power controller.

SUMMARY OF THE INVENTION

The invention is thus based on the object of providing a power controller having electromechanical pulsing, which is able to set low power levels reliably and reproducibly.

The invention can be applied in particular to electric cookers. As a rule, such an electric cooker is always connected to the three phases of a three-phase mains power supply. The first phase voltage and the second phase voltage are required for the four hot plates, while the third phase voltage is applied to the oven. Since not only the phase voltage of 230 V but also the line voltage of 400 V from the three-phase mains power supply is also available in such a circuit arrangement, a lower percentage power level can be made available safely and reproducibly by means of the connection according to the invention.

If the power requirement is high, for example for griddling or for boiling, the hot plates are switched to 400 V, while in the simmering and warming region, where less power is required, the hot plates are connected to 230 V.

If, for example, a hot plate with a heating resistance of 80Ω is used, this results in a power level of 2000 W (100%)

when connected to 400 V. If the same heating resistance is now connected to the phase voltage of 230 V, then the heating power is now $U^2/R=230^2/80=661$ W.

If the aim is now to achieve a 3% power level at the lowest setting, the power controller must be adjusted to about 9% at the lowest level. 9% of 661 W=59.5 W; 59.5 W of 2000 W=3%. In practice, the power controller would have to be set between 7.5 and 10.5%. This then results in 2.5 to 3.5% power at the lowest level.

Using this arrangement, it is thus possible to achieve a 3% power output at the lowest level even with an electromechanical power controller, which until now has been possible only using electronic power controllers.

The invention can also be applied to hot plates which are equipped with a cooking zone enlarged by a second heating circuit. With an appropriate switching arrangement, this second heating circuit can also be connected, optionally pulsed or unpulsed, to the line voltage of 400 V or to the phase voltage of 230 V.

BRIEF DESCRIPTION OF THE DRAWINGS

Exemplary embodiments of the invention will be described in the following text with reference to the drawing, in which.

DETAILED DESCRIPTION OF THE INVENTION

Figure 1:
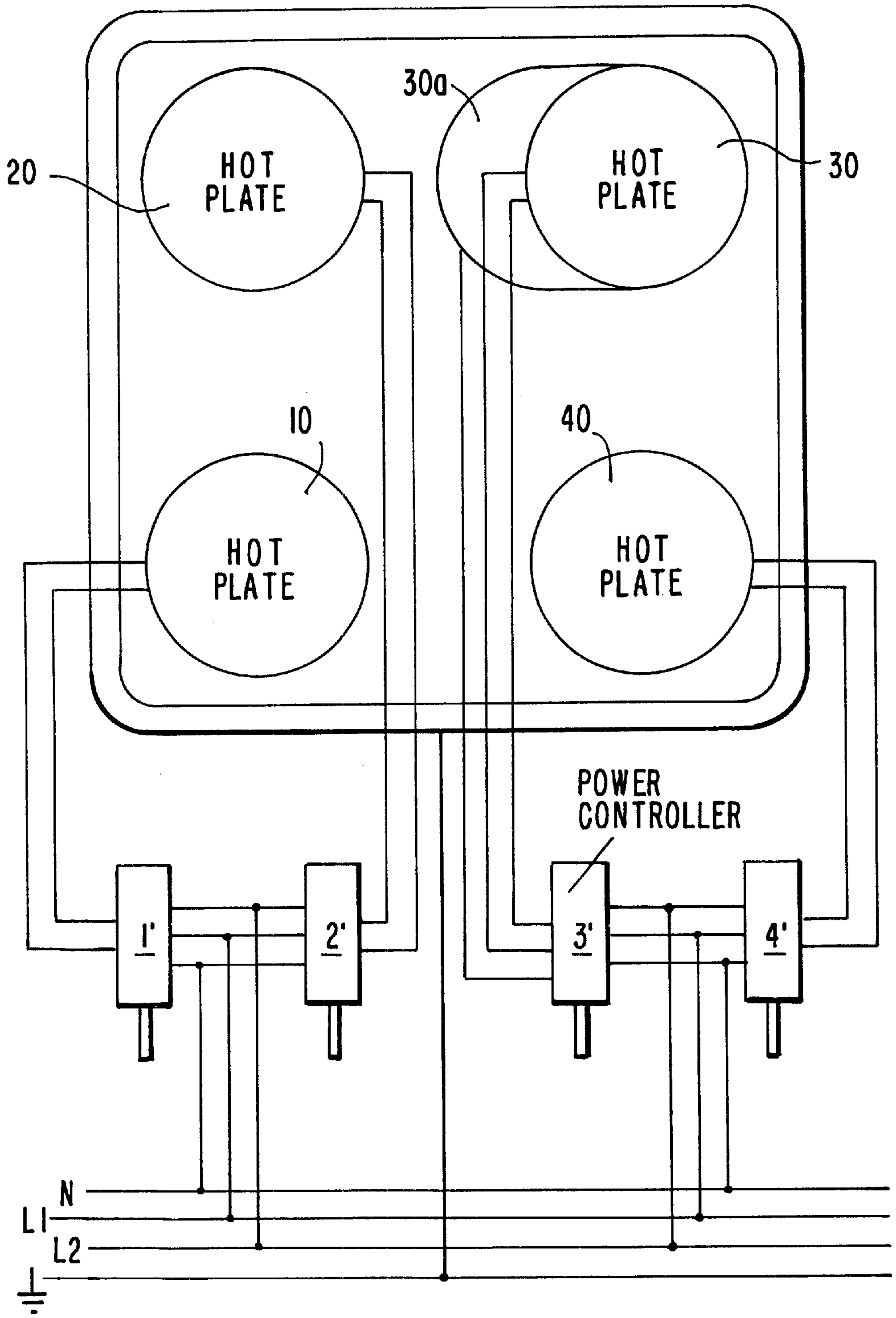
FIG. 1 shows the wiring of four hot plates of an electric cooker.

FIG. 1 shows four hot plates 10, 20, 30, 40 of an electric cooker, which are connected via rotary switches 1', 2', 3' and 4', respectively, to a three-phase mains power supply, which has the neutral conductor N and phase conductors L1 and L2. The third phase conductor, which is normally used for the oven, is not shown in this case.

The phase voltage of 230 V is thus present between the neutral conductor N and the phase conductor L1 as well as between the neutral conductor N and the phase conductor L2. The line voltage of 400 V is present between the phase conductors L1 and L2.

Figure 2:
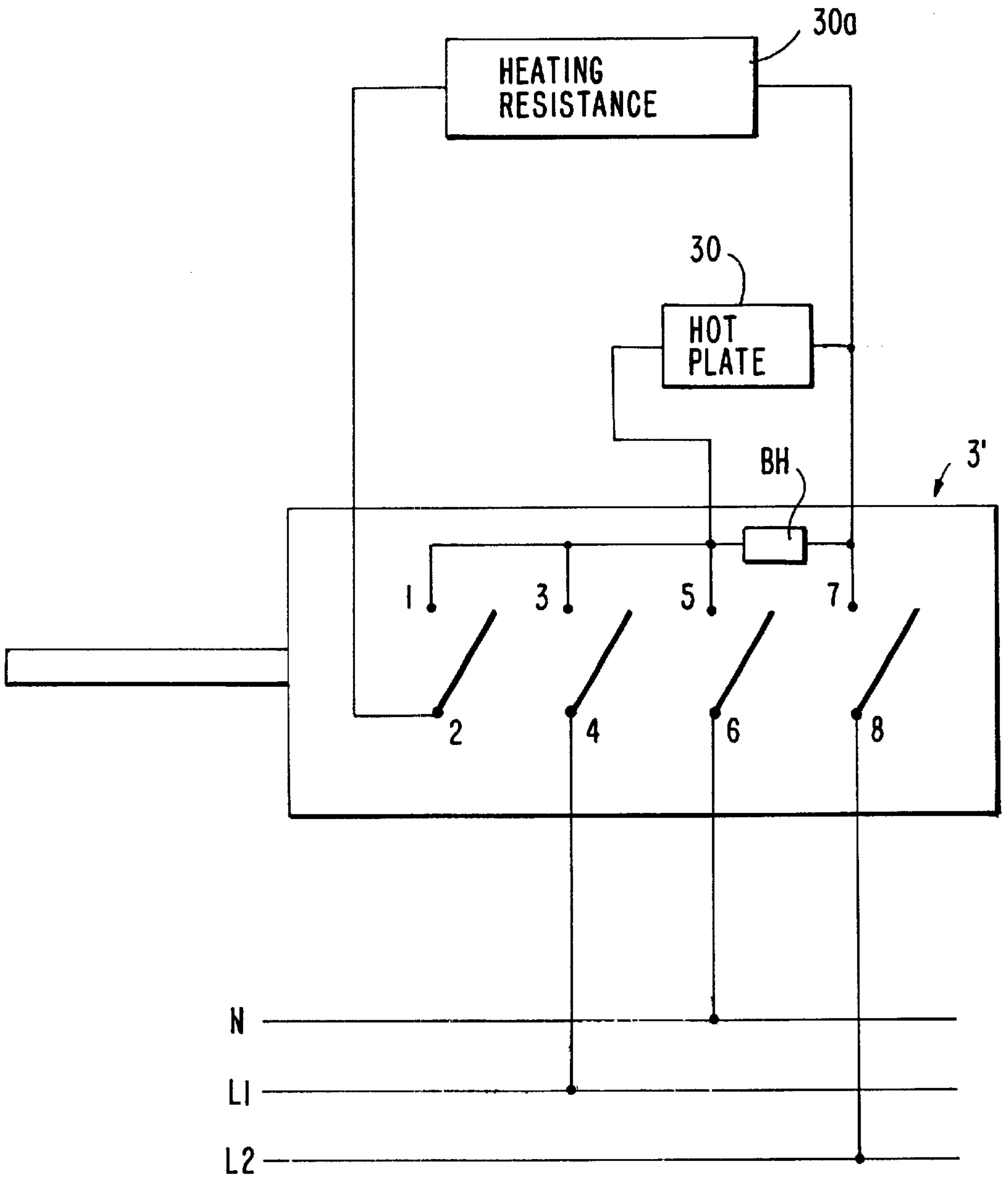
FIG. 2 shows, schematically, the mains power supply connection for a hot plate point by means of a stepping switch designed in particular as a rotary switch.

FIG. 2 shows the switching arrangement of the power controller 3' for the single hot plate 30. This differs from the power controllers 1', 2' and 4' in that a second heating circuit having a further heating resistance 30*a* is provided, which enlarges the heating zone of the hot plate 30. The reference numbers 1 to 8 denote the contacts of the power control switch 3'. The rotary switches 1', 2' and 4' differ from a structure of FIG. 2 in that they do not have a contact 1–2 and the second heating circuit.

A switching arm which is associated with the contacts 7 and 8 is pulsed by a bimetallic heating resistor BH. In a region which requires high power, a contact 3–4 is closed, so that the heating resistance 30*a* of the hot plate 30 is connected to the line voltage of 400 V. A contact 7–8 is operated by the bimetallic heating resistor BH. Depending on the setting, the switch-on time of the contacts 7–8 changes, so that the hot plate 30 is supplied with power pulses which are switched on for relatively different times. In that region in which a relatively low heating power is required, the contact 3–4 is opened, and the contact 5–6 is closed for this purpose. The hot plate 30 is now connected to the phase voltage between N and L2 (230 V).

The hot plate 30 is associated with the further heating resistance 30*a*, by means of which the heating zone of the hot plate 30 is enlarged. These enlarged heating zones are quite normal, particularly in the case of Ceran cooktops. This heating resistance 30*a* is connected to the line voltage of 400 V when the contacts 1–2 and 3–4 are closed (when the bimetallic heating resistor BH is in this switch position the contacts 7–8 are also pulsed). This second heating circuit with the heating resistance 30*a* can also be connected via the switch 3' to the phase voltage between N and L2, if the contacts 5–6 are closed instead of the contacts 3–4 (and the contacts 3–4 are opened).

Figure 2A:
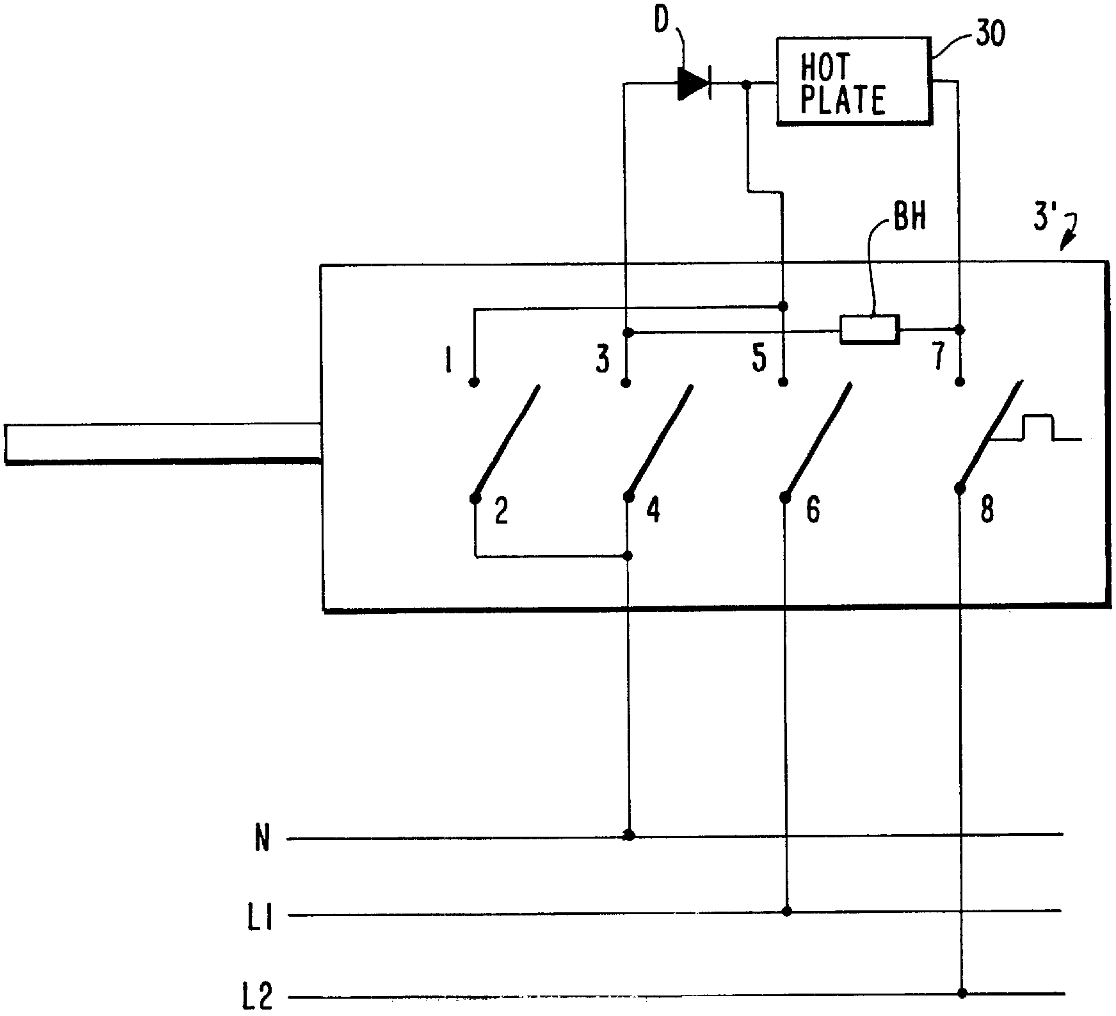
FIG. 2A shows a further circuit option for a stepping switch having a bimetallic heater (without a second heating circuit)

In the exemplary embodiment shown in FIG. 2A, the hot plate resistance 30 is connected to the connections 5 and 7 of the power controller 3'. The heating resistor BH for pulsing the bimetallic switch (which is connected between the connections 7 and 8) is connected to the connections 3 and 7. A half-wave rectifier in the form of a diode D is connected between the connections 5 and 3. The polarity of the diode is irrelevant in this case, since, as a half-wave rectifier, its only function is to reduce the voltage.

As can also be seen from FIG. 2A, the contact connections 1 and 5 on the one hand and 2 and 4 on the other hand are connected to one another. The connections 6 and 8, respectively, are connected to the phase conductors L1 and L2, respectively. The line voltage of, for example, 400 V is present between these phase conductors L1 and L2. The mutually connected connections 2 and 4 are connected to the neutral conductor N.

In order to connect the hot plate 30 to the phase voltage between L2 and N, the power controller is set such that the connections 1 and 2, the connections 3 and 4 and the connections 7 and 8 are bridged. The circuit via the hot plate resistance is then as follows:

L2-8-7-30-1-2-N.

The circuit via the heating resistor BH of the bimetallic strip is as follows:

L2-8-7-BH-3-4-N.

The bimetallic heating resistor BH is accordingly connected, in this switch position, to the phase voltage of 230 V in parallel with the hot plate heating resistance 30. The bimetallic contact between the connections 7, 8 is energized with the phase voltage of 230 V by the heating resistor BH. The diode D is short-circuited via the following conductor routing, and is thus ineffective: D-1-2-4-3-D.

When switching over to 400 V, that is to say to the line voltage which is between L1 and L2, the contact connections 5 and 6 are bridged, and the connections 7 and 8 are once again pulsed by the bimetallic heating resistor BH.

The current route via the hot plate is now as follows: L2-8-7-30-5-6-L1.

The current route for heating the bimetallic heating resistor BH is as follows: L2-8-7-BH-D-5-6-L1, that is to say, in this switch position, the series circuit formed by the diode and heating resistor BH is connected in parallel with the hot plate 30 to the line voltage. The diode D in this case acts as a half-wave rectifier, so that the root mean square value of the current is reduced to about a half, and the bimetallic heating resistor BH consumes approximately the same amount of heating power as the circuit for the heating power at 230 V. Complete correspondence of the heating power at 230 V and 400 V can be achieved by appropriate design of the circuit elements.

Figure 2B:
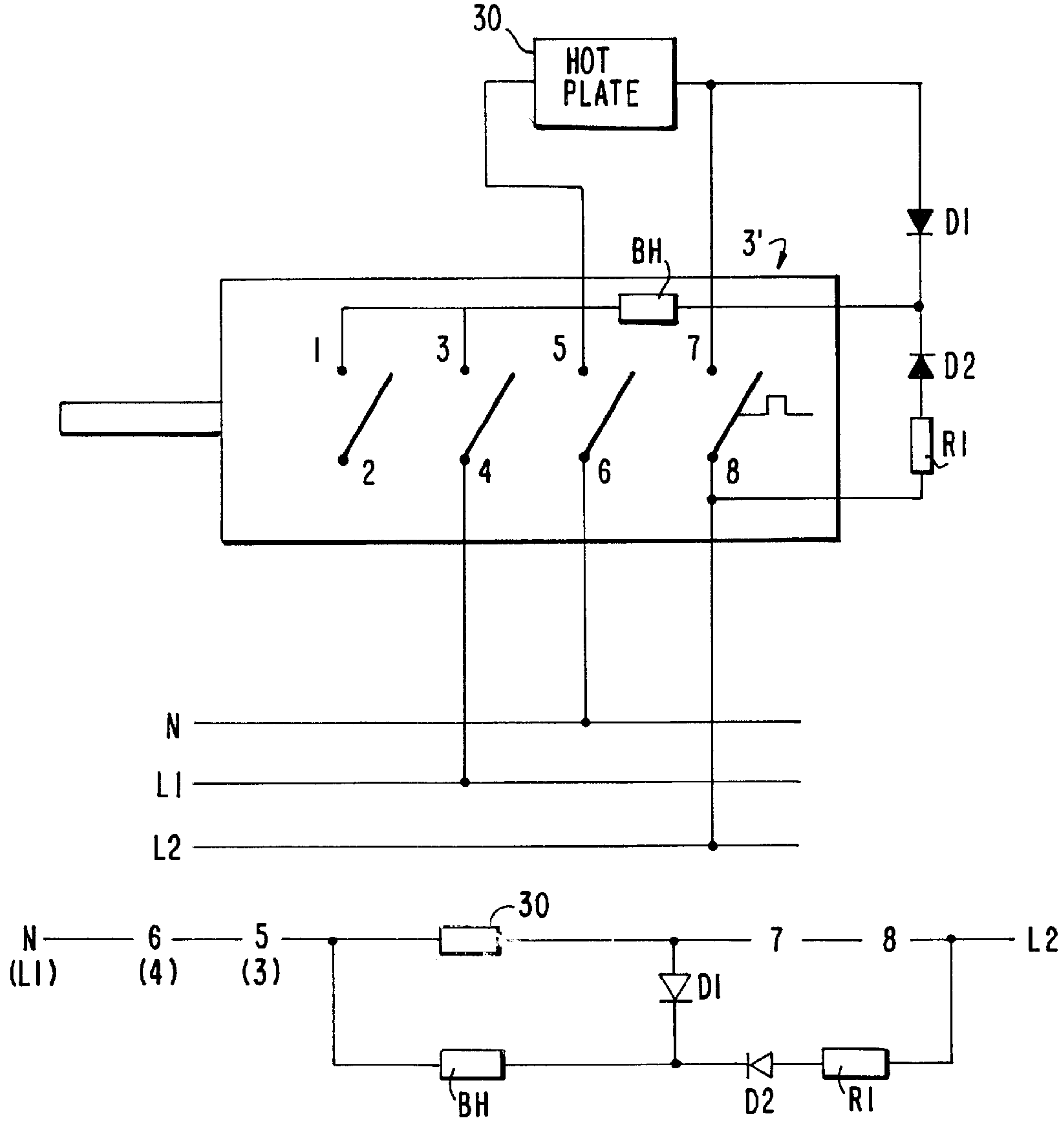
FIG. 2B shows a further circuit option for the stepping switch with an associated circuit diagram for a phase voltage (N→L2) or line voltage (L1→L2) with a delayed cooling-down period for the bimetallic strip.

FIG. 2B shows, as a further exemplary embodiment, a circuit of an electromechanical power controller which is combined with a rotary switch and uses bimetallic pulsing, by which means a very low residual power level can be set. In this case, the hot plate heating resistance 30 is once again connected between the connections 5 and 7 of the rotary switch 3'. The bimetallic heating resistor BH is connected on the one hand to the connecting terminal 5 and, via the diode D1 to the connection 7. Furthermore, as can be seen from FIG. 2B, the bimetallic heating resistor is connected to the contact 8 via the diode D2 and a resistor R1. The diodes D1 and D2 are connected back-to-back, and their positive connections are connected to the bimetallic heating resistor BH. The switching arm between the connecting terminals 8 and 7 is pulsed via the bimetallic heating resistor BH. The hot plate 30 can either be connected to the neutral conductor N by bridging the contacts 5, 6 so that the hot plate heating resistance 30 is connected to the phase voltage N-L2, or, by bridging the contacts 3, 4, a connection to L1 is produced, so that the hot plate 30 is connected to the line voltage of, for example, 400 V.

The circuit formed by D1, D2, R1 and the switching contact 7–8 is used to switch over the power supply for the bimetallic heater BH. If the switching contact 7–8 is closed, the bimetallic heater BH is supplied with 100% of its power requirement via D1. If the switching contact 7–8 is open, BH is supplied with reduced power via R1 and D2. In this case, R1 allows the power level to be set as required. This extends the cooling-down time constant.

The hot plate resistance may be, for example, 25Ω, and the resistance of the bimetallic heating resistor 5 kΩ. The bimetallic strip winding is connected via the half-wave rectifier D1 to half the operating voltage, and it is designed accordingly. When the contacts 7, 8 are open, the bimetallic heating resistor is continuously supplied with a small amount of power via the resistor R1 and the diode D2, which results in the cooling of the bimetallic strip being slowed down and the switched-off time in consequence being lengthened, which in turn leads to a reduction in the adjustable low power level. The resistor R1 can also be a current-dependent resistor or a temperature-dependent resistor, as a result of which the switching function of the electromechanical power controller is adjustable within wide limits. The back-to-back connected diodes D1 and D2 result in the current flow via the hot plate resistance 30 being blocked while the contacts 7, 8 are open (and the contacts 5, 6 or 3, 4 are closed).

The diode D2 may also be omitted if a small residual current is permissible via the hot plate resistance 30 (when switched off). The series circuit composed of R1 and the bimetallic resistor BH is then always connected to the full operating voltage.

However, at the same time, the series circuit comprising D1 and the hot plate 30 is connected in parallel with the bimetallic heater. Since the hot plate has a very low resistance in comparison with the bimetallic heater BH (a factor of 100), the positive half-cycle (D1 reverse-biased) of the current flows through R1 and the bimetallic heater BH, but the negative half-cycle flows through R1, D1 (forward-biased) and the hot plate 30. The power balance for the power supply to the bimetallic heater is thus the same as for the configuration with the diode 2.

Figure 2C:
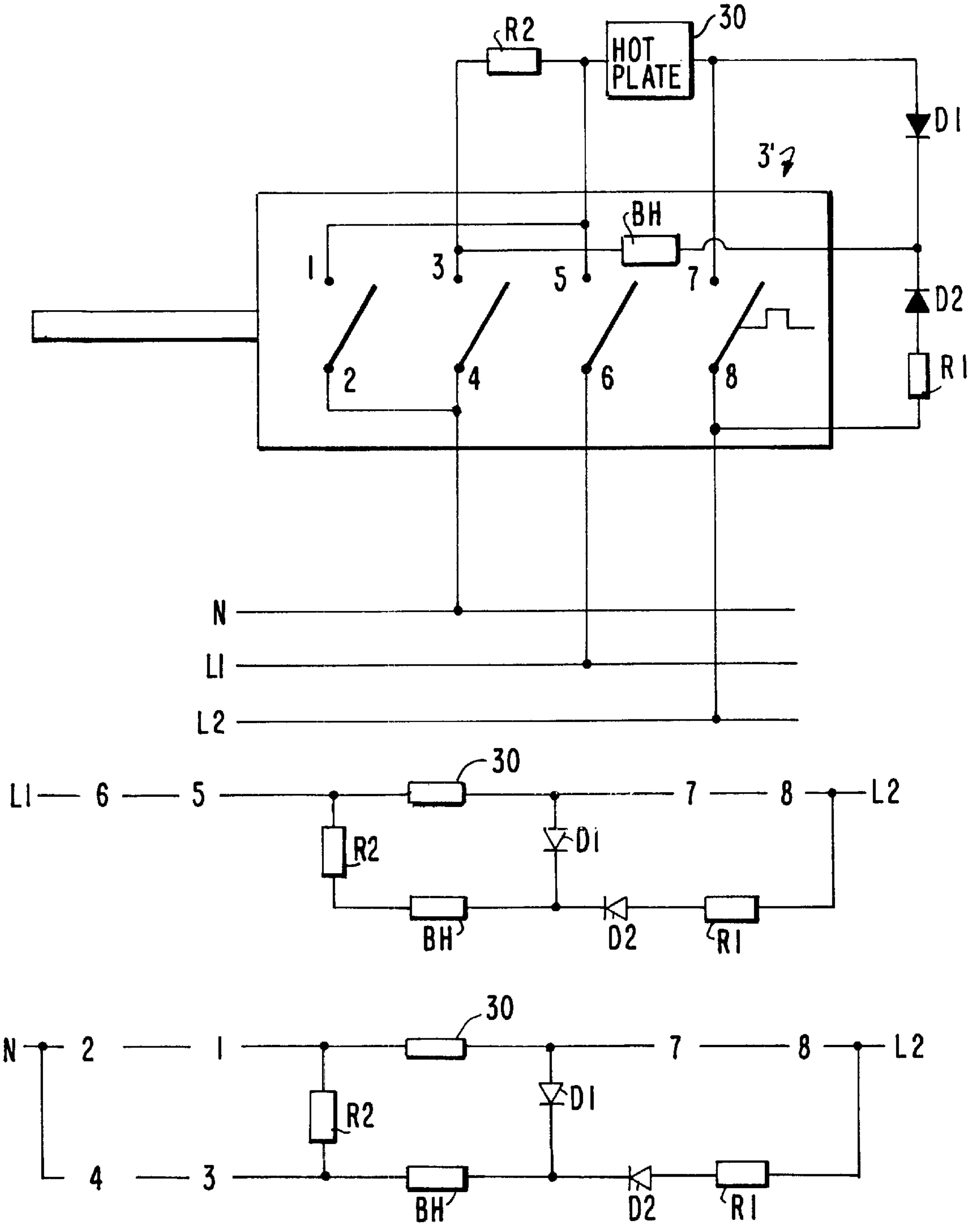
FIG. 2C shows a further circuit option for the stepping switch with associated circuit diagrams for the line voltage (L1→L2) or phase voltage (N→L2)

FIG. 2C shows a further exemplary embodiment, which illustrates a combination of FIGS. 2A and 2B. In the combination of FIG. 2A and FIG. 2B, the diode D from FIG. 2A is, however, replaced by a resistor R2, since halving the current to the bimetallic heater BH by means of a diode works only when the BH is supplied with AC voltage, which is not the case here.

Figure 3:
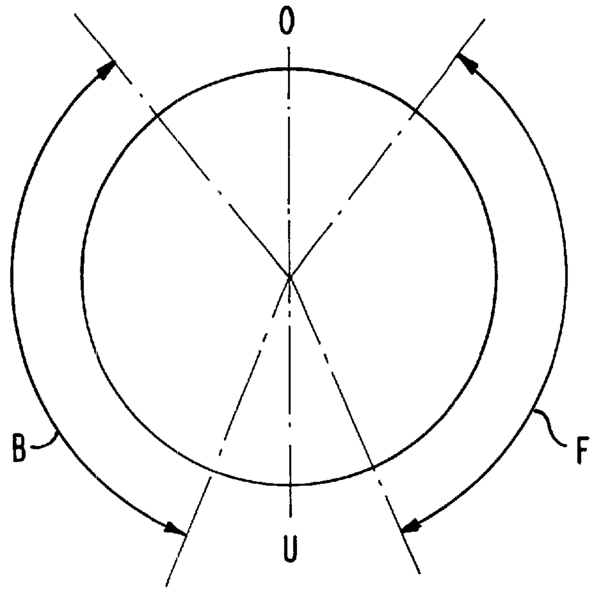
FIG. 3 shows the voltage changeover switching process schematically.
Figure 4:
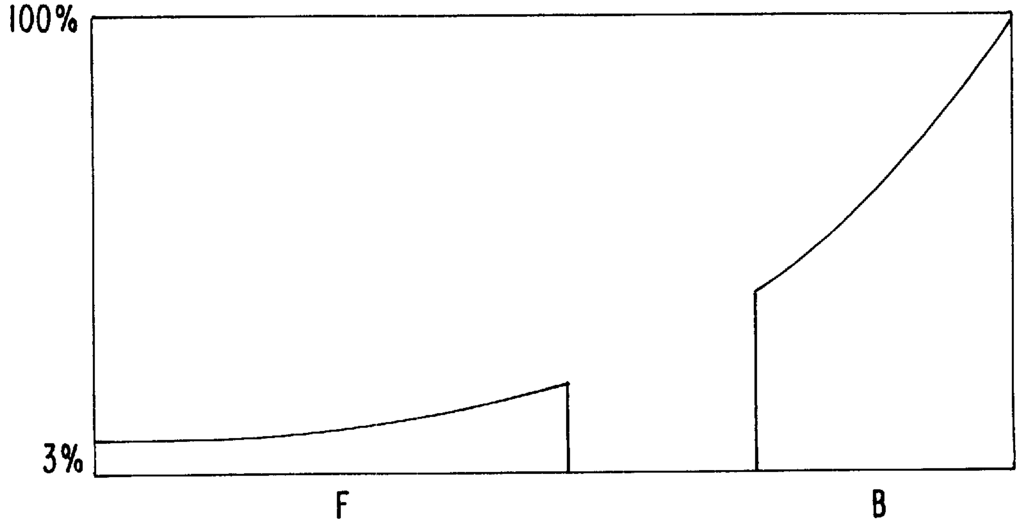
FIG. 4 shows the percentage heating ranges.

FIG. 3 shows one possible circuit diagram for the power control rotary switch by means of which, based on the neutral position, the switch positions mentioned above can be achieved in conjunction with the setting of the bimetallic strip. FIG. 4 shows one possible percentage power setting which can be achieved in this way. In FIGS. 3 and 4, the griddle region is denoted by the reference symbol B, and the region for simmering and warming is denoted by the reference symbol F. A changeover from 230 V to 400 V takes place at the point U in the diagram shown in FIG. 3.

The invention means that it is possible even when using an electromechanically pulsed power controller to provide a low heating power of about 3% of the maximum power since, the supply voltage used in the lower power range is less than in the high-power range.

What is claimed is:

1. A power controller for setting the power of an electrical appliance, wherein the power includes at least a first phase and a second phase of a three-phase power supply and the electrical appliance provides a load, the power controller comprising:

a power control switch in communication with the load and having contacts displaceable between a first switch configuration of the contacts of the power control switch wherein the load of the electrical appliance is connected to a phase voltage consisting of one of the first and second phases in a switch-on state of the contacts of the power control switch, and a second switch configuration of the contacts in the switch-on state of the power control switch wherein the load of the electrical appliance is connected to a line voltage consisting of both the first and second phases; and a bimetallic heater connected to the power control switch to adjustably pulse the power control switch in the switch-on state, so that the electrical appliance is supplied with adjustable power pulses, the bimetallic heater being connected to one of the phase and line voltages in the first and second switching configurations of the contacts of the power control switch.

2. The power controller as claimed in claim 1, wherein the load of the electrical appliance is a hot plate heating resistance which is connected to the line voltage without any interruption in the second switching configuration of the contacts of the power control switch for a high power level, and wherein the hot plate resistance is connected to the phase voltage and is pulsed via the bimetallic heater for a low power level in the first switching configuration of the contacts of the power control switch.

3. The power controller as claimed 2, further comprising at least one diode connected in parallel with the hot plate heating resistance in the first switching configuration of the contacts of the power control switch.

4. The power controller as claimed in claim 1, wherein the bimetallic heater is set to a value of 7.5 to 10.5% of the maximum power when connected to the line voltage, resulting in a power level of 2.5 to 3.5% of the maximum power when connected to the phase voltage.

5. The power controller as claimed in claim 2, wherein the bimetallic heater is connected to half an operating voltage via the one diode in the second switching configuration of the contacts of the power control switch.

6. The power controller as claimed in claim 3, wherein the bimetallic heater is connected in parallel with the hot plate resistance when the contacts of the power control switch are in the first switching configuration, the hot plate resistance and the one diode being connected in series.

7. The power controller as claimed in claim 3, wherein, when setting the hot plate resistance at the phase voltage corresponding to the first switching configuration of the contacts of the power control switch, the one diode is short-circuited.

8. The power controller as claimed in claim 5, wherein, in the second switching configuration of the power control switch in which the hot plate heating resistance is connected to the line voltage, the bimetallic heater is connected to the operating voltage via the half-wave rectifier and results in about the same pulsing as when the phase voltage is applied.

9. The power controller as claimed in claim 1, further comprising switching contacts coupled between one of the first and second phases and the load and pulsed by the bimetallic heater; and a series circuit comprising back-to-back connected diodes connected in parallel with the pulsed switching contacts.

10. The power controller as claimed in claim 9, wherein the hot plate heating resistance is connected in parallel with a series circuit formed by the bimetallic heater and one of the back-to-back connected diodes.

11. The power controller as claimed in claim 9, further comprising another resistor connected in parallel with the pulsed switching contacts.

12. The power controller as claimed in claim 11, wherein the other resistor is a current-dependent resistor.

13. The power controller as claimed in claim 11, wherein the other resistor is a temperature-dependent resistor.

14. The power controller as claimed in claim 1, further comprising a second heating circuit connected in parallel with the load.

* * * * *